United States Patent

Vandermeyder

Patent Number: 5,244,148
Date of Patent: Sep. 14, 1993

[54] ADAPTABLE HEATER CONTROL

[75] Inventor: Tom R. Vandermeyder, Orange, Calif.

[73] Assignee: Fluidmaster, Inc., Anaheim, Calif.

[21] Appl. No.: 922,185

[22] Filed: Jul. 30, 1992

[51] Int. Cl.⁵ .............................................. F23N 5/20
[52] U.S. Cl. ..................................... 236/46 R; 165/12
[58] Field of Search .................... 236/46 R; 165/12; 62/231; 237/8 R

[56] References Cited

U.S. PATENT DOCUMENTS

| | | | |
|---|---|---|---|
| 4,266,599 | 5/1981 | Saunders | 236/46 R X |
| 4,341,345 | 7/1982 | Hammer | 236/46 R X |
| 4,396,148 | 8/1983 | Masson | 237/8 R |
| 4,442,972 | 4/1984 | Sahay | 165/12 X |
| 4,557,317 | 12/1985 | Harmon | 165/12 X |
| 4,620,667 | 11/1986 | Vandermeyden | 236/46 R X |
| 4,632,177 | 12/1986 | Beckey | 236/46 R X |
| 4,655,279 | 4/1987 | Harmon, Jr. | 165/12 X |
| 4,674,027 | 6/1987 | Beckey | 165/12 X |
| 4,771,392 | 9/1988 | Hall | 236/46 R X |
| 4,832,259 | 5/1989 | Vandermeyden | 236/20 R |
| 4,921,163 | 5/1990 | Viessman | 236/46 R |
| 4,967,382 | 10/1990 | Hall | 364/557 |
| 5,025,984 | 6/1991 | Bird et al. | 165/12 X |

*Primary Examiner*—William E. Wayner
*Attorney, Agent, or Firm*—Arthur Freilich; Robert D. Hornbaker; Leon D. Rosen

[57] ABSTRACT

A new control is described for controlling the temperature of hot water or other fluids supplied to rooms of an apartment building or the like, which replaces a prior control. The new control acclimates tenants to the change in temperature resulting from the installation of the new control. The new control includes an acclimating circuit which is used during an acclimating period of a duration such as ten days, which controls the hot water supply system to produce a supply temperature (60, FIG. 2) which is between the temperature (46) that would have been supplied by the prior control, and the temperature (44) that will be supplied by the new control after the acclimating period. The acclimating circuit makes the fluid temperature progressively closer to that which would have been set by the new control, at times progressively closer to the end of the acclimating period.

9 Claims, 3 Drawing Sheets

ADAPTABLE HEATER CONTROL

BACKGROUND OF THE INVENTION

Multi-unit structures such as apartment buildings and office buildings require systems for supplying hot and-/or cold fluids. For example, apartment buildings generally require a system for supplying hot water that will be drawn off at sinks, bathtubs, and showers of the building. Hot or cold fluids such as water or air can be used to heat or cool a building. Many older buildings have simple fluid temperature controls. For example, a hot water supply system may supply hot water at the hot water tank outlet, at a constant temperature of 160° F., which assures that even in times of maximum use (e.g. if many tenants are taking showers or baths on Saturday evening) there will be enough hot water for all tenants. In another example, a hot water heating system may supply hot water to the radiators at a constant temperature of 190° F. except during summer months when the system is shut down. In such a heating system, tenants may be able to operate a manual valve to control the amount of hot water supply to their radiators, and may open the windows to limit room temperature.

It is well recognized that there is large heat losses in such simple prior systems, which can be minimized by installing a new control that varies the temperature of fluid to minimize heat losses. For example, the temperature of hot water in the supply tank may be reduced during early morning hours when there is very little demand. As another example, the temperature of hot water supplied in a room heating system may be varied according to the outdoor temperature. U.S. Pat. No. 4,832,259 by Vandermeyden (the inventor in the present application), describes a sophisticated hot water heater controller which varies hot water temperature in accordance with many factors including expected demand at a particular time of day, outdoor temperature, etc.

Applicant has found that when a new control is installed to replace a prior control, that the building manager will often receive many complaints from tenants. For example, a prior control for a hot water heating system may have always supplied hot water at 190° F., although tenants can lower room temperature by partially closing water flow valves and opening windows. If the new system supplies water at a lower temperature such as 140° F. at night under the same circumstances, then the tenant may complain that the radiator is too cold. Apparatus which minimize discomfort of tenants during a period after a new fluid temperature control was installed, until tenants became accustomed to the manner of operation of the new control, would minimized disruption of tenants and consequent problems of building managers, as well as encouraging the installation of new controls to minimize energy expenditures.

SUMMARY OF THE INVENTION

In accordance with one embodiment of the present invention, a new control is provided for replacing a prior control that controls the temperature of fluid supplied to rooms of a building, which helps acclimate tenants to changes in fluid temperature resulting from installation of the new control. The new control includes an acclimating circuit which operates during an acclimating period of a plurality of days. The acclimating circuit establishes a fluid temperature at any given time, which is generally between the temperature that would be set by the prior control and the temperature that would be set by the new control after the acclimating period. The acclimating circuit preferably adjusts the fluid temperature to lie progressively closer to the temperature that would be set by the new control after the acclimating period, at times progressively closer to the end of the acclimating period.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
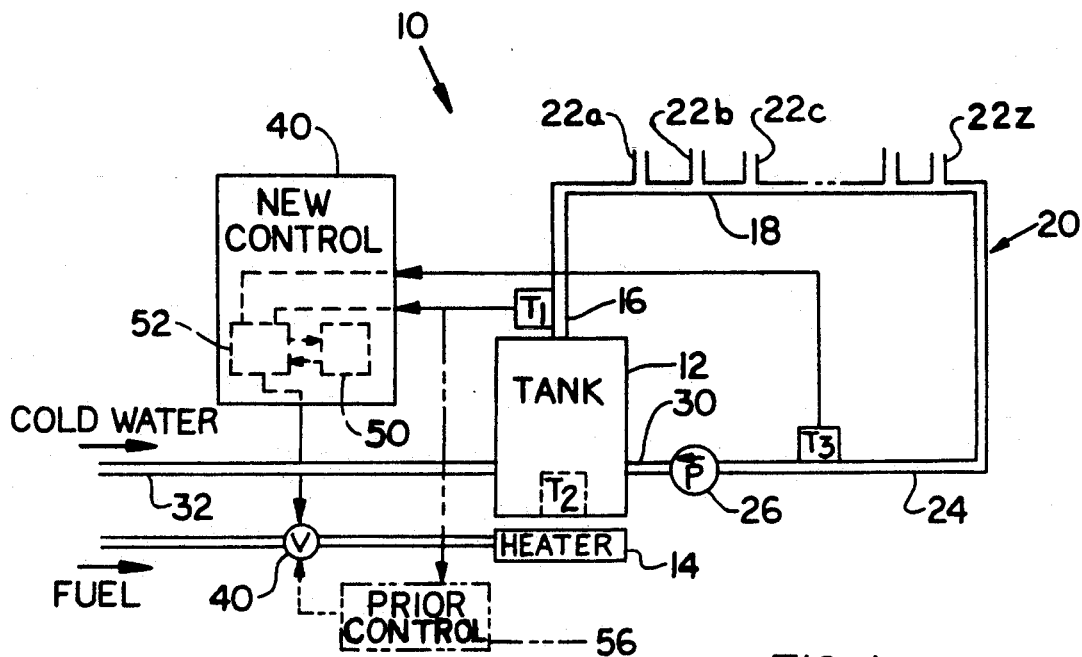
FIG. 1 is a schematic view of a typical hot water supply system incorporating the control of the present invention.

FIG. 1 illustrates a typical hot water supply system for a multi-unit building such as an apartment building. The system includes a hot water storage tank 12 whose water is heated by a heater 14, the two of them forming a hot water heater apparatus. Water exits the tank through a tank outlet 16 and moves along a supply portion 18 of a pipeline 20 past numerous water consumption stations labeled 22a-22z which may represent different units in the structure. After passing by the last consumption station 22z, the water moves along a return portion 24 of the pipeline and through a recirculating pump 26 to a recirculating inlet 30 of the water tank. As water is drawn off at the consumption stations, new water is supplied at a water supply inlet 32 leading to the tank.

There are two prime requirements in operating the system. The primary requirement is that all units be supplied with water of sufficiently high temperature, such as at least 110° F., at whatever consumption rate that occurs. A second consideration is that the amount of fuel used at the heater 14 be a minimum while meeting the first requirement. For most hot water uses, such as for showers and baths, the user attempts to draw whatever amount of water is required to obtain a predetermined comfortable temperature. If the hot water supplied to the station is at a high temperature such as 145° F., then each user will open the hot water faucet only slightly and there is likely to be sufficient hot water during times of high demand than if the water tank temperature is lower. Many older buildings have therefore maintained the water temperature at a constant high level such as 145° F. to 160° F.

Considerable energy is lost by the transfer of heat from the hot water-carrying pipeline 20 to the environment. The amount of heat loss can be minimized by minimizing the temperature of water in the pipeline 20, so long as the temperature is high enough at the last consumption station, such as at least 110° F. to meet the needs of the tenants.

FIG. 1 shows a new control 40 which is used to maintain the supply temperature $T_1$ at the tank outlet so as to meet consumption requirements while minimizing the supply temperature so as to minimize heat losses through a hot pipeline 20. The control measures the supply temperature $T_1$ and the return temperature $T_3$ along the return portion 24 of the pipeline, and also considers the consumption pattern at different times of day and at different days of the week for the particular building. (The control could also use the temperature $T_2$ of water at the bottom of the tank, although this is not discussed herein). The control uses this information to control a fuel valve 42 that controls the passage of fuel, such as natural gas, to the heater 14. The new control replaces a prior control indicated at 56.

Figure 2:
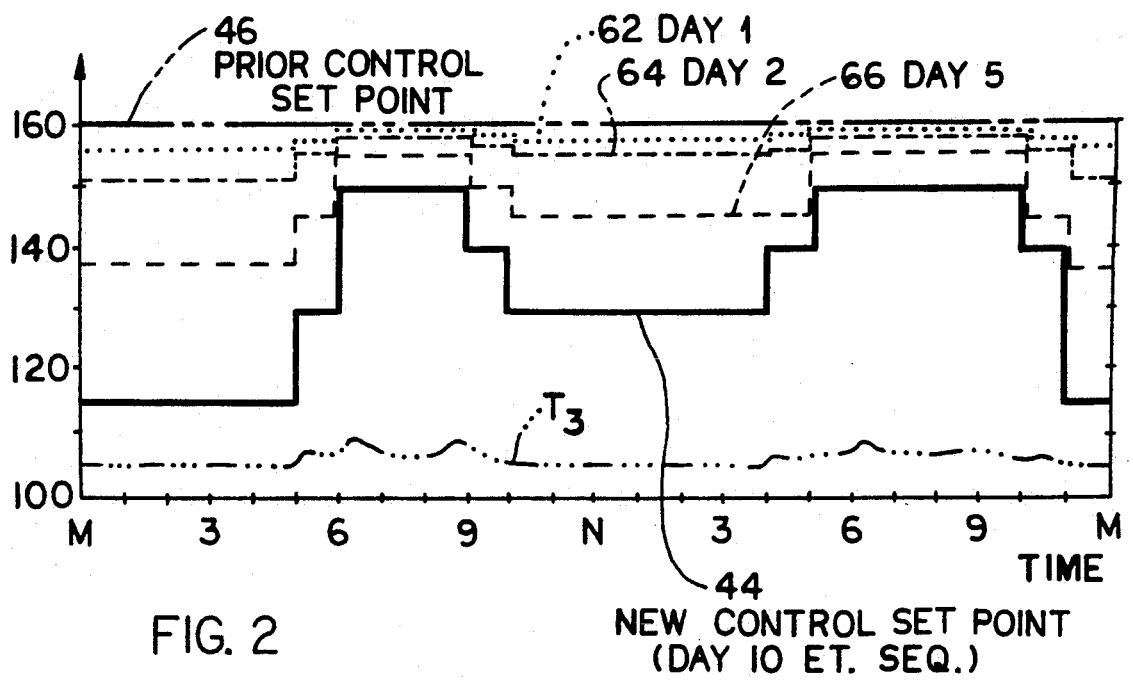
FIG. 2 is a chart showing variation in hot water supply temperature with time of day during one day of operation, for a prior control, for a new control after an acclimating period, and for the new control during three different days of the acclimating period, and also showing the return temperature after the acclimating period.

FIG. 2 includes a graph 44 showing variation of the set point temperature (the desired temperature $T_1$, which is almost always attained by the control) with time of day during a particular day which is fairly typical of eventual system operation. During the period midnight to 5 a.m., the supply temperature is 115° F., which assures hot water at minimal acceptable temperature for the very occasional use of hot water in the early morning hours. At 5 a.m. the temperature rises to 130° F. to meet the demands of early risers. At 6 a.m., the temperature rises to 150° F. to meet the needs of a large number of tenants who will draw considerable hot water for bathing etc. This temperature continues until 9 a.m., when the supply temperature drops to 140° F., and then at 10 a.m. drops to 130° F. which is maintained until 4 p.m. The temperature then rises and rises again at 5 p.m. to meet needs for washing dishes, bathing etc. At 10 p.m., and then at 11 p.m., the water temperature drops, because of minimal hot water usage. The actual temperature at any given time, can vary if there is a sudden increase in demand for water. The particular temperature profile is based on the demand for hot water measured during an earlier similar period, such as during each half hour period for a day that occurred seven days previously. U.S. Pat. No. 4,832,259 by Vandermeyden describes a system which performs such hot water control to minimize heat losses while providing sufficient hot water almost all of the time.

Applicant finds that when a new control, such as the type described in U.S. Pat. No. 4,832,259, is installed, building managers commonly receive complaints from tenants. For example, a tenant who is used to drawing 160° F. hot water during the early morning hours such as at 3 a.m., to take a shower, may be used to opening a hot water valve only slightly and the cold water valve completely, to obtain a comfortable net temperature such as 105° F. If the new control results in the hot water temperature at 3 a.m. being 115° F., then the tenant may believe that the hot water is too cold and may complain to the manager. Actually, it requires the tenant to realize that the hot water is at only a moderate temperature, and to open the hot water valve almost completely and the cold water valve perhaps half way, to obtain a comfortable temperature. Although tenants would be informed that a new control is being installed, it still may require many days of difficult hot water use by the tenants before they realize how to deal with the different hot water temperature profile.

In accordance with the present invention, applicant constructs the new control 40 so it has an acclimating circuit 50 in addition to a main circuit 52. The main circuit 52 is similar to the circuit described in U.S. Pat. No. 4,832,259, which produces a set point temperature profile such as shown at 44 in FIG. 2 as compared to the temperature set by a prior control 56. Graph 46 in FIG. 2 shows that the prior control set point temperature was a constant 160° F. at all times. In that case, the prior control 56 merely measured the supply temperature $T_1$ (a temperature sensor lies at $T_1$) and adjusted the fuel valve 42 to maintain the supply temperature $T_1$ within predetermined limits such as between 156° F. and 164° F.

In accordance with the present invention, the acclimating circuit 50 is provided to adjust the temperature of hot water supplied to the system, during an acclimating period such as of ten days duration. FIG. 2 shows that halfway during an acclimating period of ten days duration, during day 5, the temperature profile is as given by graph 66. The hot water temperature indicated by graph 60 lies halfway between the prior control set point temperature 46 and the new control set point temperature 44 (which the new control will set after the acclimating period). Thus, at 3 a.m. on a particular day, while the set point temperature on graph 46 would be 160° F., and the new control set point temperature along graph 44 would be 115° F., the set point temperature along graph 60 would be halfway in between, or at 137.5° F. During day one, indicated by graph 62, the set point temperature would be one tenth of the way between the prior control set point 56 and the new control set point 44. During day two, indicated by graph 64, the set point temperature would be two tenths of the way from the prior control temperature 46 to the new control temperature 44. Thus, the acclimating circuit causes the set point temperature to gradually change from the temperature that would be set by the prior control, to the temperature that would be set by the new control after the acclimating period. The change in set point temperature progresses substantially linearly with time. It may be noted that while the temperature set by the new control of FIG. 1 is the temperature $T_1$ at the tank outlet 16, the set point supply temperature can be the temperature of water somewhere in the water tank, or at some other location along pipe line 20, which indicates the temperature of water that will be supplied to the tenants.

A tenant who finds that the temperature of water supplied to his faucet gradually changes from the old profile to the new, is less likely to experience discomfort and to complain. For example, the above mentioned person who takes a shower at 3 a.m. every morning, may find that during day 1 of the acclimating period, he must open the hot water valve slightly more than usual. Each day, he may find that he must open the hot water valve slightly more than previously to achieve a comfortable shower water temperature. The gradual change allows the tenant to adapt with minimal discomfort, especially if he is notified beforehand that a new hot water control is being installed which may vary the temperature of the hot water.

Figure 3:
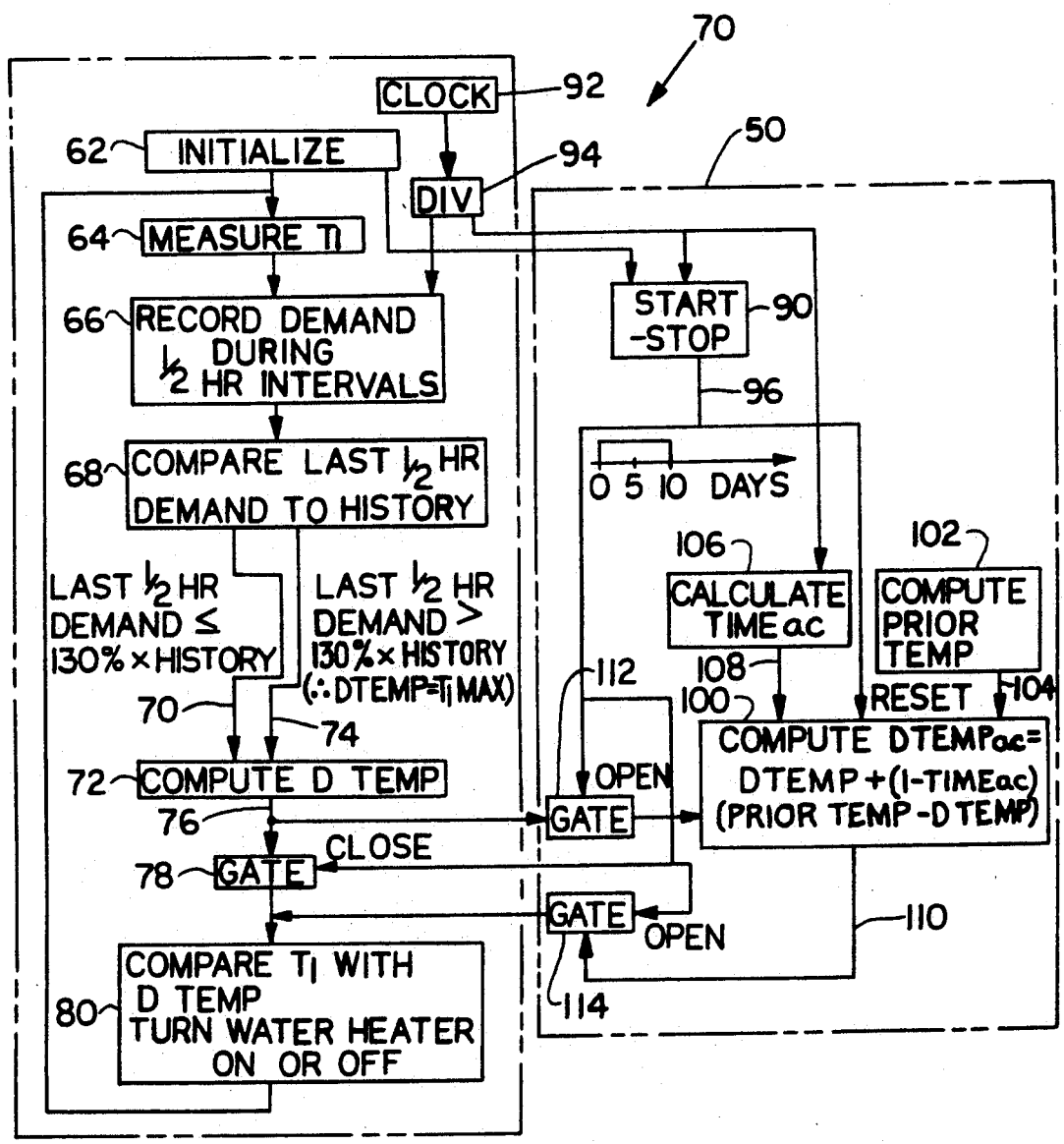
FIG. 3 is a combined flow chart and block circuit diagram, showing the overall sequence of operation of the system of FIG. 1.

FIG. 3 is a flow diagram 70, which indicates steps in operation of the system, and which also indicates blocks or subcircuits of the circuitry of the controller. In the figure, the temperature $T_1$ represents the actual measured temperature at the water tank outlet, while DTEMP represents the desired temperature at the tank outlet. The first step indicated by block 62 is to initialize the system, during which the desired temperature DTEMP is set at the maximum temperature such as 160° F. In the present example, the maximum temperature such as 160° F. is the level used for the building prior to installation of the present system. A next step 64 is to measure the actual temperature $T_1$ at the tank outlet. A next step 66 is to record the demand for hot water heating during each one half hour interval during a day. The demand can be deemed to equal the amount of fuel used during a particular half hour period, divided by the maximum amount of fuel used during any half hour period for the past twenty four hours.

The next step in FIG. 3, at 68, is to compare the demand for hot water during the previous half hour to the historical demand, such as the demand during a corresponding half hour period exactly one week previously. This comparison is used to determine whether the present demand pattern is similar to the previous history, or whether there is a drastic change such as may be caused by a change between standard and daylight savings time or a holiday. A first possibility indicated by line 70 is that the demand during the past half hour is no more than 130% of historical demand (e.g. demand at the same time one week ago). In that case the next step 72 is to compute DTEMP which is given by the formula:

$$DTEMP = T_1min + (T_1max - T_1min) \times \frac{historical\ demand}{max\ demand}$$

where $T_1$ min is the minimum allowable temperature at the tank outlet, such as 115° F., $T_1$max is the maximum tank outlet temperature such as 160° F. Historical demand is a measure of the amount of heat used during a comparable historic half hour period, such as the heater being on ten minutes, or 30% of the time, during a half hour period one week ago. "Max demand" represents the maximum demand, such as the heater being on all thirty minutes or 100% of the time during that half hour period within the last twenty four hours, when demand was greatest. In one example, where $T_1$min is 115° F., $T_1$max is 160° F., and the ratio of demands is 30%, the quantity DTEMP is equal to 128.5° F. This means that where this formula is used, and no further temperature adjustment is made (as for $T_3$), a temperature $T_1$ of 128.5° F. would be sufficient to assure that all stations will receive water at at least 110° F. For the most likely patterns of consumption expected during that one-half hour period. In that case, the output on line 70 represents the desired temperature at the water tank outlet, based upon historical demand.

Another possibility, indicated by line 74, is that demand for hot water (based on the per cent of time the heater was on during the previous half hour) is more than 130% of historical demand. In that case, a signal on line 74 indicates that in step 72, the computed desired temperature DTEMP will be the maximum temperature, which in this case is 160° F. The computed temperature is delivered over line 76 and can be considered to be a first signal representing the first fluid supply temperature to be maintained when the hot water system is controlled by the new control after any acclimating period. The signal on line 76 representing DTEMP, passes at step 78 through a gate which can be opened or closed, to a circuit which performs a step indicated at 80, to compare the actual supply water temperature $T_1$ with the desired or set point temperature DTEMP. The water heater is turned on or off depending upon whether the supply temperature $T_1$ is below or above DTEMP (actually below or above a predetermined range such as 126° F. to 131° F.). After the step 80 where the desired temperature DTEMP is calculated, the process repeats, with the measurement of the supply temperature $T_1$ at 64. A processor which relies upon the temperature $T_1$ at the tank outlet to minimize energy losses, is described in above-mentioned U.S. Pat. No. 4,832,259.

The acclimating circuit 50 includes a start-stop step or subcircuit 90 which starts an acclimating period of a duration such as ten days, during which the set point temperature DTEMP slowly adjusts. A clock 92 which is part of the main circuit, produces pulses that are delivered through a divider at 94 at the start-stop subcircuit 90. After a predetermined period such as a week, when the system is initialized by recording historical demand during each day of the week, the subcircuit 90 delivers a signal over line 96 to a subcircuit 100 that computes the current acclimating temperature which is written as $DTEMP_{ac}$. The acclimating temperature equals DTEMP (which is the desired temperature under the new control) plus a per cent of the difference between the prior temperature that would be set at that time by the prior control and DTEMP. The following formula express this:

$$DTEMP_{ac} = DTEMP + (1 - TIME_{ac})(PRIOR\ TEMP - DTEMP)$$

where $DTEMP_{ac}$ is the desired temperature at a given instant during the acclimating period, $TIME_{ac}$ equals the percent of the total acclimating period that has elapsed at that given instant (or that has elapsed at the beginning of that day), and PRIOR TEMP is the temperature that would have been set by the prior control at that instant.

A subcircuit 102 delivers a second signal on line 104 representing the second supply temperature (PRIOR TEMP) that would have been set by the prior control at that time. In the example of FIG. 2, the prior control set point would always be 160° F. Another subcircuit 106 in FIG. 3 generates a signal on line 108 representing $TIME_{ac}$ which is the per cent of the total acclimating period that has expired since the beginning of the acclimating period. Thus, at the beginning of day 2 of a ten day acclimating period, $TIME_{ac}$ equals 20%. The subcircuit 100 calculates $DTEMP_{ac}$ based upon DTEMP obtained over line 76, the acclimating time received over line 108, and the second supply temperature received over line 104. The output of the circuit 100 is delivered on line 110 to the step or subcircuit at 80 whose function is to assure that the supply temperature $T_1$ equals the desired temperature DTEMP or $DTEMP_{ac}$.

The acclimating circuit 50 includes a gate 112 which when open, passes the first signal on line 76 and representing DTEMP, to the subcircuit 100 which computes $DTEMP_{ac}$. During the acclimating period of perhaps ten days, the signal on line 96 opens the gate 112 to allow the signal to pass to the subcircuit 100. Another gate 114 is opened by the signal on line 96, and allows the third signal on line 110 representing $DTEMP_{ac}$, to pass to the subcircuit 80 to control the temperature of water in the tank. The signal on line 96 also passes to a gate 78 in the main circuit, to close that gate and prevent the first signal on line 76 from passing directly to the subcircuit 80.

Thus, after an initialized period such as one week, when the history of water usage is recorded, the acclimating circuit 50 is operated for an acclimating period such as ten days. During the acclimating period, the circuit 50 calculates a desired or set point acclimating temperature $DTEMP_{ac}$ which is between the temperatures DTEMP and PRIOR TEMP represented on lines 76 and 104. The actual acclimating set point moves progressively closer to the temperature represented on line 76. After the acclimating period, the acclimating circuit 50 is no longer used, and a gate 78 is allowed to open to allow the temperature DTEMP produced by the new control after the acclimating period, to control the tank water temperature.

Figure 4:
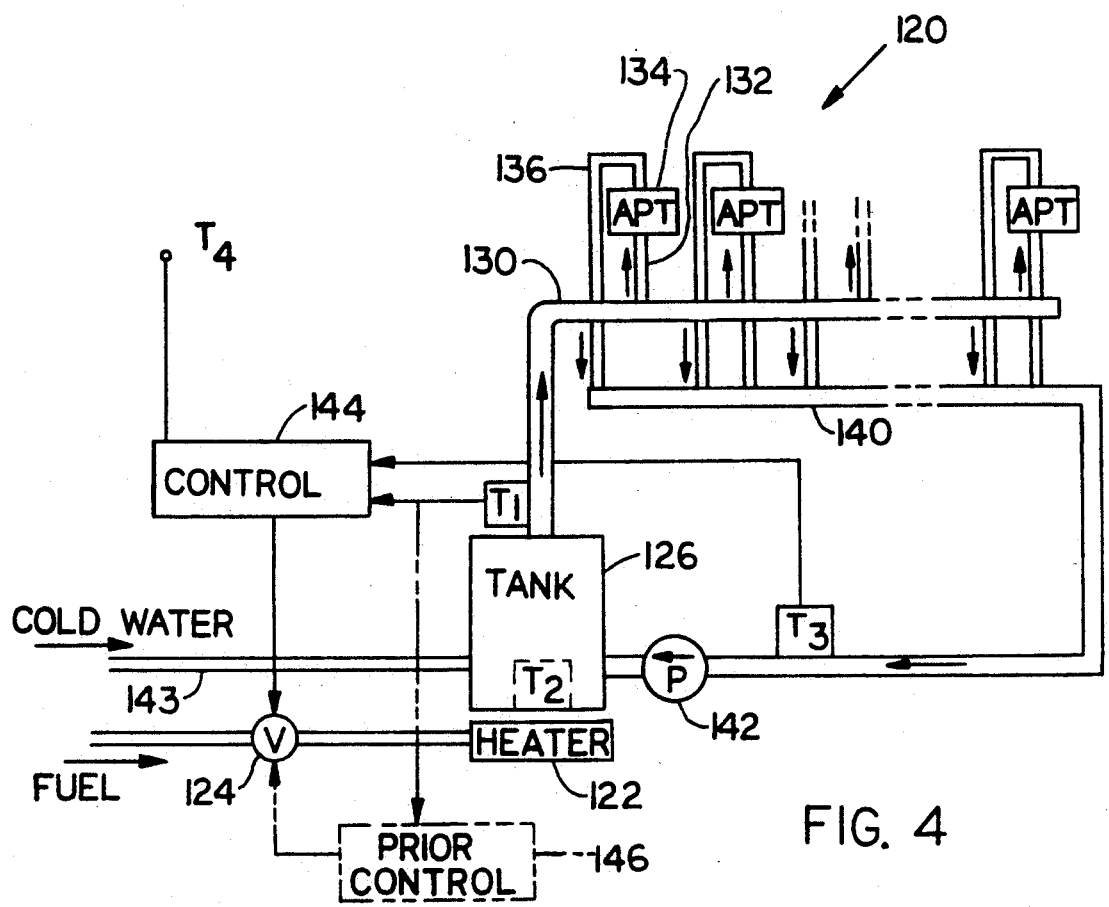
FIG. 4 is a schematic diagram of a typical hot water room heating system incorporating the control of the present invention.

The same approach to acclimating tenants for a hot water supply system, is useful in other applications such as in heating and air conditioning rooms or apartments of a building. FIG. 4 illustrates a hot water space heating system 120, which is somewhat similar to the hot water supply system of FIG. 1, except that higher temperatures are required to heat radiators in the rooms, the hot water is not removed from the system at the rooms, and the outdoor temperature $T_4$ is of much greater importance than in a hot water supply system. A heater 122 receives fuel passing through a valve 124 and heats water in a tank 126. Water from the tank passes through a main supply line 130 and through individual pipes such as 132 leading to one or more radiators 134 in an apartment, and then through a pipe 136 to a main return line 140. The water is circulated by a pump 142. Any water loss is made up through a cold water supply line 143. A new control 144 controls the fuel valve 124 to maintain a selected supply temperature $T_1$. The control determines the desired hot water temperature $T_1$ in accordance with the outdoor temperature $T_4$, and other factors such as the temperature $T_3$ along the return line.

The new control 144 replaces a prior control 146 which maintained a predetermined hot water supply temperature $T_1$ such as 190° F. at all times except perhaps during summer months when the system was shut down. The only input to the prior control 146 was the water supply temperature $T_1$, which the prior control used to control the fuel valve 124.

Figure 5:
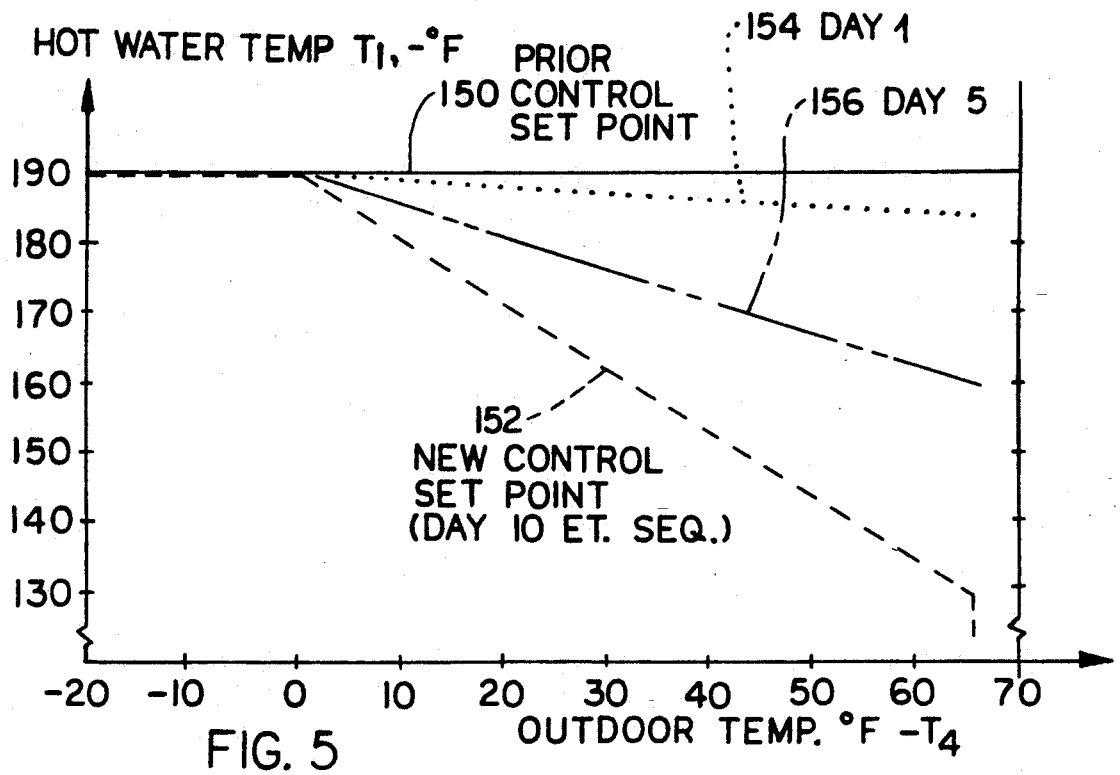
FIG. 5 is a graph showing the variation in hot water supply temperature with variation in outdoor temperature, assuming all other factors are equal, for the prior control, the new control after the acclimating period, and for different days during the acclimating period.

FIG. 5 shows the variation in hot water temperature $T_1$ as a function of outdoor temperature $T_4$, which would be maintained by the old control and by the new control. Line 150 represents the prior control set point, which was 190° F. at all times when the system was operating (except during the summer months). Each tenant turned a manual valve to control the flow of hot water through his radiator to avoid overheating in moderate weather. Line 152 represents the variation in new control set point temperature as a function of outdoor temperature, after the acclimating period, which is herein assumed to be of ten days duration. It can be seen that when there is a moderate outdoor temperature such as 50° F., the new control maintains a hot water supply temperature of only about 144° F., which is much less than the temperature of 190° F. maintained by the prior control. The much lower hot water temperature results in much less heat loss along the pipes carrying hot water to and from the apartments. The graph lines of FIG. 5 assume that outdoor temperature $T_4$ is the only variation in circumstances.

The new control assumes that tenants will keep any manual valve almost fully open under most circumstances, with apartment temperature regulated primarily by the temperature of the supply water, rather than by tenants manually operating a variable flow shutoff valve. If the new control were installed when there was only a moderate outdoor temperature such as 50° F., then tenants might complain that the rooms were too cold, until they got used to leaving the valve near full open and closing the windows. Applicant's new control provides an acclimating period, during which the hot water set point gradually changes from the prior control line 150 to the new control line 152. Thus, during day 1 of a ten day acclimating period, the set point temperature is as shown by graph 154, which is one tenth of the way between the line 150 and line 152. During day 5 indicated by line 156, the set point temperature is halfway between lines 150 and 152. After ten days, the set point temperature is as shown by line 152, assuming no other factors are considered. The new control 144 can be described by the flow diagram and circuit diagram of FIG. 3.

Thus, the invention provides a new control for use with a system that supplies fluid such as hot or cold water or air, to different units in a building such as apartments in an apartment building. The new control includes an acclimating circuit which gradually adjusts the set point temperature, or desired temperature of fluid to be supplied to the rooms, to gradually change from the temperature that would have been set by the prior control, to the temperature that would be set by the new control after the acclimating period. It is possible to have an acclimating circuit which makes a single adjustment to an intermediate temperature, although it is preferable that the acclimating circuit make several changes in temperature profile to make tenants gradually acclimate to the temperature produced by the new control. The acclimating period is preferably between two days and three weeks in most systems.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. A new control for use with a system that can supply fluid to rooms in a building at a variable supply temperature dependent upon the temperatures represented by input signals, which replaces a prior control, where said new control will eventually generate a first of said input signals representing a first fluid supply temperature which is different from a second fluid supply temperature that said prior control would have maintained at the same time, wherein:

said new control includes an acclimating circuit which controls said new control to produce a third of said input signals representing a third fluid supply temperature of fluid to be supplied during an acclimating period of a plurality of days, where said third temperature is between said first and second temperatures.

2. The control described in claim 1 wherein:

said acclimating circuit controls said third signal which represents a third temperature so said third temperature is progressively closer to said first temperature represented by said first signal at times progressively closer to the end of said acclimating period.

3. The control described in claim 2 wherein said system is a heating system that includes at least one pipe that extends to said rooms and that also includes a hot water heater apparatus that supplies hot water at a variable temperature to said pipe, and wherein:

said new control includes a clock, said first, second and third signals represent at least the temperature of said hot water, and said first signal represents a hot water temperature that is less than the hot water temperature represented by said second signal during the period 2 a.m. to 3 a.m. of most days of a year;

said acclimating control controls said third signal to represent a hot water temperature that lies between the temperatures represented by said first and second signals between the period of 2 a.m. to 3 a.m. during said acclimating period.

4. The control described in claim 2 wherein:
said acclimating circuit controls said third signal so the change in said third temperature progresses substantially linearly with time.

5. The control described in claim 1 wherein:
said first fluid supply temperature at a given time is written as DTEMP, said second fluid supply temperature at said given time is written as PRIOR TEMP, said third fluid supply temperature at said given time is written as $DTEMP_{ac}$, the per cent of said acclimating period which has elapsed at said given time is written as $TIME_{ac}$, the relationship among said quantities is substantially as given by the following equation:

$$DTEMP = DTEMP + (1 - TIME_{ac})(PRIOR\ TEMP - DTEMP)$$

6. A new control which can replace a prior control, to control the supply temperature of hot water supplied to rooms of a building by a hot water supply system wherein:

said new control comprises a main circuit that includes at least one sensor, and that generates a first signal representing a first desired supply temperature of hot water at multiple times during each day;

said new control also comprises an acclimating circuit which has a first subcircuit that generates a second signal representing a second supply temperature that would have been set by said prior control, and a second subcircuit that compares said first and second signals and that generates a third signal representing a third desired supply temperature of hot water at multiple times during each day, during an acclimating period lasting a plurality of days, where said third temperature is between said first and second temperatures at multiple times during each day;

said new control uses said third signal to control the supply temperature of said hot water during said acclimating period, and thereafter uses said first signal to control the supply temperature of said hot water.

7. The control described in claim 6 wherein:
said second subcircuit is constructed so said third temperature is progressively closer to said first temperature during progressively later days during said acclimating period.

8. A method for operating a heating system that controllably supplies hot fluid to rooms of a building during a period of time after a new control has been installed that replaces a prior control that previously controlled the temperature of the hot fluid, comprising:

during a majority of an acclimating period that lasts a plurality of days, operating said new control to cause said system to supply said fluid at a temperature that is between the temperature that would have been set by said system under the control of said prior control and the temperature that would have been set by said system under the control of said new control after said acclimating period.

9. The method described in claim 8 wherein:
at times during said acclimating period which are progressively closer to the end of said acclimating period, operating said new control to cause said system to apply said fluid at a temperature that is progressively closer to the temperature that would have been set under the control of said new control after said acclimating period, and progressively further from the temperature that would have been set under the control of said prior control.

* * * * *